US006326108B2

(12) United States Patent
Simons

(10) Patent No.: US 6,326,108 B2
(45) Date of Patent: Dec. 4, 2001

(54) RANDOM COLOR FILTER ARRAY

(75) Inventor: Michael J. Simons, Middlesex (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/810,787

(22) Filed: Mar. 16, 2001

(30) Foreign Application Priority Data

Mar. 23, 2000 (GB) .................................................. 0006942

(51) Int. Cl.[7] .............................. G02B 5/20; G03C 1/825
(52) U.S. Cl. ................................................. 430/7; 430/511
(58) Field of Search ........................................ 430/7, 511

(56) References Cited

U.S. PATENT DOCUMENTS 822,532 6/1906 Lumiere .
3,728,116 * 4/1973 Waxman et al. ..................... 430/222
4,971,869 11/1990 Plummer .
5,804,359 9/1998 Simons .

FOREIGN PATENT DOCUMENTS 0 935 168 8/1999 (EP) .

* cited by examiner

*Primary Examiner*—John A. McPherson
(74) *Attorney, Agent, or Firm*—Frank Pincelli

(57) ABSTRACT

A color filter array comprises a water soluble or water dispersible binder, at two or more color classes of water immiscible colored filter elements and a further color class of water immiscible colored filter elements. The mean diameter of the further class of filter elements is less than the mean diameter of the at least two color classes of elements. The color filter array is useful in image capture devices including digital cameras, scanners and photographic film.

10 Claims, 1 Drawing Sheet

RANDOM COLOR FILTER ARRAY

FIELD OF THE INVENTION

This invention relates to color filter arrays for use in image capture devices such as digital cameras, scanners and photographic film.

BACKGROUND OF THE INVENTION

The great majority of color photographs today are taken using chromogenic color film, in which color-forming couplers, which may be incorporated in the film or present in the processing solution, form cyan, magenta and yellow dyes by reaction with oxidized developing agent which is formed where silver halide is developed in an imagewise pattern. Such films require a development process which is carefully controlled in respect of time and temperature, which is usually followed by a silver bleaching and a fixing step, and the whole process typically takes several minutes and needs complex equipment.

Color photography by exposing a black-and-white photographic emulsion through a color filter array which is an integral part of the film or plate on which the photographic emulsion is coated, has long been known to offer certain advantages of simplicity or convenience in color photography. Thus the Autochrome process, disclosed by the Lumiere brothers in 1906 (U.S. Pat. No. 822,532) exposed the emulsion through a randomly disposed layer of red, green and blue-colored potato starch grains, and the emulsion was reversal processed to give a positive image of the scene which appeared colored when viewed by light transmitted through the plate. The process allowed the formation of a colored photograph without the chemical complexity of later photographic methods.

The Dufaycolor process (initially the Dioptichrome plate, L.Dufay, 1909) used a regular array of red, green and blue dyed patches and lines printed on a gelatin layer in conjunction with a reversal-processed black-and-white emulsion system, which similarly gave a colored image of the scene when viewed by transmitted light.

Polavision (Edwin Land and the Polaroid Corporation, 1977) was a color movie system employing a rapid and convenient reversal processing method on a black-and-white emulsion system coated above an array of red, green and blue stripes, which gave a colored projected image. It was marketed as a still color transparency system called Polachrome in 1983.

These methods suffered a number of disadvantages. The images were best viewed by passing light through the processed film or plate, and the image quality was not sufficient to allow high quality prints to be prepared from them, due to the coarse nature of the Autochrome and Dufaycolor filter arrays, and the coarse nature of the positive silver image in the Polavision and Polacolor systems. The regular array patterns were complicated and expensive to manufacture. In addition, the films which used regular or repeating filter arrays were susceptible to color aliasing when used to photograph scenes with geometrically repeating features.

U.S. Pat. No. 4,971,869 discloses a film with a regular repeating filter array which claims to be less susceptible to aliasing problems. The film comprises a panchromatic photographic emulsion and a repetitive pattern of a unit of adjacent colored cells wherein at least one of the cells is of a subtractive primary color (e.g. yellow, magenta or cyan) or is of a pastel color. Scene information can be extracted from the developed film by opto-electronic scanning methods.

EP 935 168 discloses a light sensitive material comprising a transparent support having thereon a silver halide emulsion layer and a randomly arranged color filter layer comprising colored resin particles. The document also discloses exposing, processing and electro-optically scanning the resultant image in such a film and reconstructing the image by digital image processing.

Color photographic films which comprise a color filter array and a single image recording layer or layer pack have the advantage of rapid and convenient photographic processing, as the single image recording layer or layer pack can be processed rapidly without the problem of mismatching different color records if small variations occur in the process. A small change in extent of development for example will affect all color records equally. Exceptionally rapid processing is possible using simple negative black-and-white development, and if suitable developing agents are included in the coating, the photographic response can be remarkably robust or tolerant towards inadvertent variations in processing time or temperature. Developing agents suitable for including in the coating, and a preferred way of incorporating them, are disclosed in U.S. Pat. No. 5,804,359.
Problem to be solved by the Invention It is desirable that the method of manufacturing the color filter array be of comparatively low cost. Known methods of making regular filter arrays, such as those used for Dufaycolor or Polachrome films, are complex and costly, involving several sequential applications of materials to the film. Known methods of making random filter arrays, such as those used for Autochrome film and that described in EP 935 168 also involve complex operations, including separating and grading or sizing the colored particles of starch or resin respectively, dispersing them in a coating medium, coating and drying and then calendaring the coated layer to flatten the particles.

An economical method of manufacturing a random color filter array is described in co-pending application Ser. No. 09/808,844, reference 11574, by the applicant, filed on the same day as the present application. The method uses existing photographic manufacturing methods such as oil-in-water dispersion and photographic coating, so new equipment is not required. There is no need to separate or isolate the color elements, little or no volatile organic solvents need to be evaporated or recovered, and the only drying step is the normal drying of a coated photographic film. No calendaring step is needed as the fluid filter elements become flatter as the coating dries, as depicted in the schematic FIGS. 1 and 2 of that application. This results in a simplified and economical production process when compared with the Autochrome method or the method described in EP 935 168.

In the case of color filter arrays of the types described in the co-pending application Ser. No. 09/808,844, reference 11574, and in EP 935 168, which contain randomly disposed colored particles or droplets, it has been found that improved color information may be recorded if the space in between the randomly disposed colored particles or droplets is filled with a further color, when viewed from a direction normal to the plane of the array. For example, if there are red and blue randomly disposed colored particles or droplets, the space between them may be colored green. This is illustrated schematically in FIG. 1 of the present application. In EP 935 168, an example is given (Example 2) in which the gelatin binder between the colored resin particles is colored by addition of a yellow dye, corresponding to Color 3 in FIG. 1 below.

SUMMARY OF THE INVENTION

According to the present invention there is provided a color filter array comprising a water soluble or water dispersible binder, at least two color classes of water immiscible colored filter elements and a further color class of water immiscible colored filter elements the mean diameter of which is less than the mean diameter of the at least two color classes of elements.

Preferably the larger color class of elements have a mean diameter of between 2 and 20 micrometers and the further color class of elements have a mean diameter of less than 0.3 micrometers.

Advantageous Effect of the Invention

Color filter arrays according to the invention, in which the space between the randomly disposed colored particles or droplets is filled with a further color class of small water-immiscible colored filter elements or particles, which may be supported in a polymeric binder, offer improved performance over an array in which the polymeric binder is colored with a soluble dye.

The physical integrity of the array is improved. Dyes can be displaced from their binding sites and diffuse within the coating, thus degrading the properties of the array. Colored particles or droplets of the invention remain bound in place.

Stability against fading is improved. Pigment particles in particular can have exceptional stability against fading in the light or dark, while dyes in a polymeric matrix are prone to fading.

In addition, it is possible to incorporate a greater molar concentration of particulate matter in a given thickness of coated polymer layer than of bound, molecularly dispersed dye, thus allowing improved filter optical densities within the limited thickness of the preferred design of color filter array.

The color filter array is useful in image capture devices including digital cameras, scanners and photographic film.

Reference is made to related commonly owned co-pending applications entitled Method of Making a Random Color Filter Array, (reference 11574), Ser. No. 09/808,844, and Film with Random Color Filter array, (reference 11575), Ser. No. 09/808,873, both filed concurrently herewith, the entire contents of which are incorporated herein.

BRIEF DESCRIPTION OF THE DRAWINGS

The invention will now be described, by way of example, with reference to the accompanying drawings in which.

DETAILED DESCRIPTION OF THE INVENTION

Figure 1:
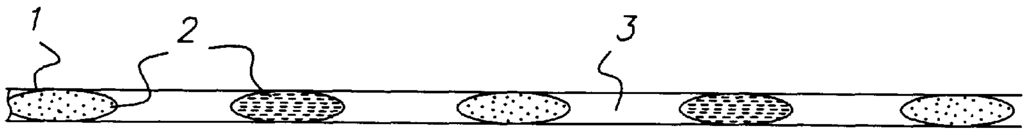
FIG. 1 is a schematic view of a filter layer known in the prior art.

FIG. 1 is a schematic representation of a filter layer 1 known from the prior art. This layer has three different colors. Colored particles 2 of two different colors are randomly dispersed in a binder 3. The third color is a soluble dye within the binder.

Figure 2:
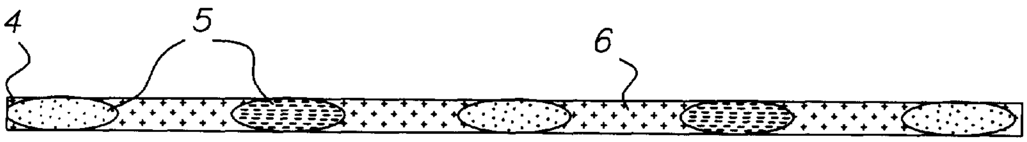
FIG. 2 is a schematic view of a filter layer according to the present invention.

FIG. 2 is a schematic representation of a filter layer according to the invention. The filter layer 4 comprises a plurality of larger colored elements 5 of two different color classes randomly dispersed within a plurality of smaller colored elements 6 of a third color class.

The larger class of colored elements 5 of the color filter array may comprise various substances, including beads or particles of polymers or resins, droplets of water-immiscible organic solvents. These solvents may be so-called coupler solvents as used in the photographic industry, in which are incorporated dyes or pigments.

Suitable water-immiscible organic solvents are in general of low volatility, and include for example tricresyl phosphate, di-n-butyl phthalate, diundecyl phthalate, N,N-diethyl lauramide, N.N-di-n-butyl lauramide, triethyl citrate and trihexyl citrate. Other solvents, which may be partially water-soluble, such as ethyl acetate and cyclohexanone, may be used in addition during the preparation of the dispersions, and they may be removed from the final dispersion or coating either by washing or by evaporation.

Suitable dyes may be oil-soluble in nature, and can be chosen for example from the classes of solvent dyes and disperse dyes listed in the Color Index, $3^{rd}$ Edition, published by The Society of Dyers and Colorists, Bradford, England. Specific examples are listed under their Color Index (CI) names, and include CI Solvent Blue 14, CI Solvent Blue 35, CI Solvent Blue 63, CI Solvent Blue 79, CI Solvent Yellow 174, CI Solvent Orange 1, CI Solvent Red 19, CI Solvent Red 24, CI Disperse Yellow 3, and 4-phenylazodiphenylamine.

Suitable pigments are chosen for their properties of hue, fastness, and dispersibility, and can include CI Pigment Green 7, CI Pigment Green 36, CI Pigment Blue 15:3, CI Pigment Blue 60, CI Pigment Violet 23, CI Pigment Red 122, CI Pigment Red 177, CI Pigment Red 194, CI Pigment Orange 36, CI Pigment Orange 43, CI Pigment Yellow 74, Cl Pigment Yellow 93, CI Pigment Yellow 110, and CI Pigment Yellow 139.

When pigment particles are incorporated in the colored elements, they should be of a fine particle size, preferably substantially less than one micrometer. Various other substances including polymeric and particulate substances may be incorporated within the colored droplets or particles, including dispersing agents such as those used in the pigment and paint industries.

Examples of dispersing agents include the Solsperse™ range of dispersants marketed by Avecia Limited, such as Solsperse 5000, Solsperse 17,000, Solsperse 22,000, and Solsperse 24,000. Further Solsperse dispersing agents are numbered 13650, 13940, and 34750. Another suitable dispersing agent is Carbam 111™, marketed by AAA (Applied Analytics and Automation, M. H. Mathews Additive & Messgerate, Bad Nauheim, Germany).

Polymeric additives to modify the rheology or other properties of the fluid droplets include oil soluble polymers such as polyvinyl butyral, styrene polymers and copolymers, vinyl polymers and copolymers, and acrylate polymers and copolymers.

The individual colored elements may be spherical in shape. Alternatively they may be flattened to approximate to disk-like shapes, or they may be of other shapes. Their diameter, or equivalent diameter when viewed from a direction normal to the plane of the array, is in the range 2 to 20 micrometers.

If the coloring agents are dyes, then these may be dissolved in a water-immiscible organic solvent in the quantity required to give the required depth of color in the color elements 5 when coated. Combinations of dyes may be used to give the desired spectral properties.

If the coloring agents are pigments, then the appropriate quantity of pigment or pigments are mixed with a water-immiscible organic solvent, together with dispersing agents if required. This mixture is milled to reduce the pigment particles to a suitable size which in general should be less than half a micrometer in length or diameter, and preferably less than 0.3 micrometers. Various milling methods and devices known in the art of pigment preparation may be used. These include ball mills, media mills and sand mills.

The resulting colored water-immiscible organic solvent or oil may then be dispersed in an aqueous medium so as to form colored droplets of the desired size. Dispersing methods known in the photographic art may be used, and these include rotor-stator devices, homogenizers and emulsifiers which force the liquid at high shear through orifices or channels. Ultrasonic devices such as horns and probes may also be used. The oil/water interface may be stabilized by addition to the aqueous phase of surfactants, polymers including natural polymers such as gelatin, and particulate species such as colloidal silica. Surface stabilization by particulate species such as colloidal silica is particularly preferred as it can give a narrow size distribution of the resultant colored droplets and the size of the droplets may be controlled by the concentration of the particulate species employed. The dispersed droplets may remain fluid or liquid, as disclosed in co-ending application Ser. No. 09/808, 844, reference 11574. Altematively the droplets may become solid, for instance by using a volatile water-immiscible organic solvent in which is dissolved a polymer or resin and then evaporating off the volatile water-immiscible organic solvent to leave polymer or resin particles in which are dissolved or dispersed dye molecules or pigment particles.

The water-immiscible filter elements of the smaller size class 6 may be similar in composition to those of the larger size class. However, in a preferred embodiment, they may comprise pigment particles dispersed in the water-soluble or water-dispersible polymeric binder. Their diameter or equivalent diameter, when viewed from a direction normal to the plane of the array, is sufficiently small that they fill in the spaces between the water-immiscible filter elements of the larger size class 5 as schematically depicted in FIG. 2. The diameter is less than 1 micrometer, preferably less than 0.1 micrometers, and greater than 10 nanometers. The water-immiscible filter elements of the smaller size class 6 constitute a filter color class further to the two or more color classes in the larger size class 5. This color class of small filter elements may comprise a mixture of particles of two or more colors. For example, if the small filter elements represent a green color class, this color class may comprise a mixture of finely milled cyan and yellow pigment particles. If the color class is red, then it may comprise a mixture of finely milled magenta and yellow pigment particles. If the color class is blue, then it may comprise a mixture of finely milled cyan and magenta pigment particles. Suitable pigments include those listed above, and the bridged aluminum phthalocyanine (bis(phthalocyanylalumino) tetraphenyldisiloxane), obtained from the Synthetic Chemicals Division of Eastman Kodak Co. The pigment dispersion may be prepared using milling methods and devices known in the art of pigment preparation including ball mills, media mills and sand mills. The pigment may be milled in an aqueous composition which may include dispersing agents such as surfactants, including alkyl and aryl sulphates and sulphonates including oleyl methyl taurine, and/or water-soluble polymers such as polyvinyl pyrrolidone and gelatin.

Normally, at least three color classes of filter element will be required, and various combinations are possible, for example red, green and blue; cyan magenta and yellow; cyan, yellow and green; and cyan, magenta, yellow and green, and so on.

The color filter array may be prepared by mixing together dispersions of the two or more color classes of filter element of the larger size class and the further color class of filter element of the smaller size class and coating them on a suitable substrate. The substrate may be transparent film base and may have layers including photographic emulsion layers already coated on it. The coated laydown of filter elements of the larger size class should be adjusted to give the desired closeness of packing in the dried layer without excessive overlapping of droplets. It is preferred to adjust the coated laydown of water-soluble binder so that the dried thickness of the binder layer containing the smaller size class filter elements is similar to or smaller than the thickness of the dried-down filter elements of the larger size class, as depicted schematically in FIG. 2.

Normally a hardening agent will be added to one or more layers of the film so that the binder(s) in the film, including the water-soluble binder in the filter layer, becomes hardened or cross-linked to make the array physically robust. In the case of a photographic film, this allows the film to swell but not dissolve in the developer and other processing solutions.

Figure 3:
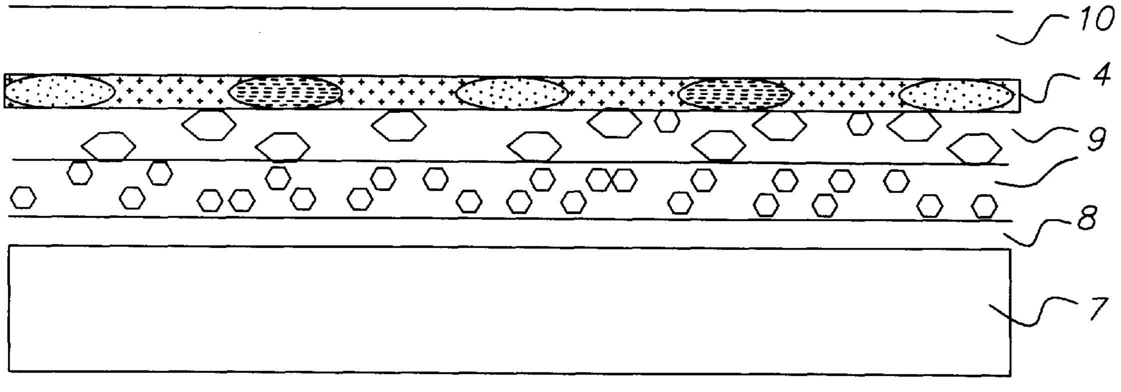
FIG. 3 is a schematic view of a film incorporating a filter layer according to the present invention.

In the case that the array of the invention is used in a photographic film, a suitable film structure is depicted in FIG. 3 by way of example. The film comprises a support layer 7, an anti-halation layer 8, at least one photographic emulsion layer 9, a color filter array layer 4 and a supercoat 10. Such a film is exposed in a camera so that the light from the scene passes through the color filter array 4 before striking the photographic emulsion layers 9. The film is developed and optionally fixed. It then may be scanned with a film scanner in transmission mode, and the digital image data thus acquired may be image processed to generate a colored image of the scene.

Color filter arrays according to the invention may also be used in digital image capture devices such as digital cameras and scanners. The filter array is fixed or cemented onto an image sensor whose light detection elements are sensitive to the various wavelengths of light transmitted by the color filter array.

The following example describes the preparation and use of a photographic color film containing a color filter array according to the invention.

Preparation of Photographic Light-sensitive Layers:

Photographic film base was coated, by means of an experimental slide-hopper coating machine, with the following layers: Layer 1: aqueous gelatin solution and a particulate dispersion of an antihalation dye whose color was dischargeable in the developer solution, were coated to give coated laydowns of 1.2 and 0.1 g/m2 respectively.

Layers 2 and 3 comprised photographic silver bromoiodide tabular grain emulsions of varying grain size, and a dispersion of the incorporated developing agent DA, N,N'-(4-hydroxy-1,3-phenylene)bis(4-(dodecyloxy)-benzenesulphonamide), which was present as a conventional photographic dispersion, being dispersed in the presence of an equal weight of the coupler solvent tricresyl phosphate. The emulsions were all sensitized with sulphur and gold, and with red sensitising dyes which gave spectral sensitivity across the visible spectrum. The following laydowns were coated, the emulsion laydowns being quoted as grams per square meter of silver, not silver halide:

Layer 2:

Gelatin, 3.2 g/m2

Developing agent DA, 1.25 g/m2

Medium-fast emulsion, 1.3$\mu$ equivalent diameter, 0.12$\mu$ thickness, 0.8 g/m2

Medium-slow emulsion, 0.66μ equivalent diameter, 0.12μ thickness, 1.2 g/m2

Slow emulsion, 0.55μ equivalent diameter, 0.08μ thickness, 1.2 g/m2

4-hydroxy-6-methyl-1,3,3A,7-tetraazindene, sodium salt, was also present at 1.5 g per mole of silver.

Layer 3

Gelatin, 1.4 g/m2

Developing agent DA, 0.45 g/m2

Fast emulsion, 2.6μ equivalent diameter, 0.12μ thickness, 1.4 g/m2

4-hydroxy-6-methyl-1,3,3A,7-tetraazindene, sodium salt, was also present at 1.5 g per mole of silver.

Layer 4:

Gelatin, 0.6 g/m2

Hardener bis(vinylsulphonyl)methane, 0.08 g/m2

Preparation of Color Filter Array Layer:

The color filter array comprised a coating of dispersions of red droplets and green droplets in a larger size class, and a mixture of finely milled cyan and magenta pigment particles in the smaller size class. A suspension of the combined dispersions in dilute gelatin solution was coated on top of the photographic light sensitive layers.

Red Dispersion:

Pigments were dispersed in an oil phase. The following were placed in a glass jar together with about 100 ml of 1 mm diameter zirconia beads, and the jar was rotated on a roller mill for three days:

| | |
|---|---|
| Irgazine red A2BN* | 15 g |
| Cromophtal Yellow 3RT* | 6 |
| Solsperse 17000** | 1.5 |
| dissolved in tricresyl phosphate | 50 |
| Solsperse 22000** | 0.38 |
| Tricresyl phosphate | 10 |
| N,N-di-n-butyl lauramide | 60 |
| Ethyl acetate | 37.5 |

*pigments supplied by CIBA Specialty Chemicals plc
**dispersing agents supplied by Avecia (Pigments and Additives)

The resulting oil dispersion was then dispersed in an aqueous phase as follows:

| | |
|---|---|
| To 30 g of the red oil dispersion was added Silica dispersion* | 50 g |
| Water | 70 |

*the silica dispersion was prepared as follows:

To 318 g of water was added 12 g of Ludox (trademark) SM30 colloidal silica suspension and 3.6 g of a 10% w/v aqueous solution of a copolymer of methylaminoethanol and adipic acid. The mixture was stirred and its pH adjusted from its initial value of 4.86 to 4.00 by addition of 4M sulphuric acid.

and the combined mixture was agitated for 5 minutes with a "Soniprobe" ultrasonic probe (supplied by Lucas Dawe Ultrasonics) to form an oil-in-water dispersion. The probe used had a tip diameter of half an inch, (1.3 cm) and the power setting employed was 6.5 or 65%.

| | |
|---|---|
| The resulting dispersion was then added to Gelatin solution in water, 12.5 wt % | 35 g |
| Water | 80 |
| Poly(styrene-alt-maleic acid), sodium salt, 5 wt % solution in water | 30 |
| sodium dodecyl sulphate 10 wt % solution in water | 5. |

When coated on a glass slide and allowed to dry, microscopic examination showed approximately circular red elements of approximately 7 microns average diameter.

Green Dispersion:

Pigments were dispersed in an oil phase. The following were placed in a glass jar together with about 100 ml of 1mm diameter zirconia beads, and the jar was rotated on a roller mill for three days:

| | |
|---|---|
| Irgalite Green GFNP* | 8 g |
| Cromophtal Yellow 3G* | 7 |
| Solsperse 5000** | 0.5 |
| Solsperse 24000** | 3 |
| Tricresyl phosphate | 32 |
| N,N-di-n-butyl lauramide | 32 |
| Ethyl acetate | 20.5 |

*pigments supplied by CIBA Specialty Chemicals plc
**dispersing agents supplied by Avecia (Pigments and Additives)

The resulting oil dispersion was then dispersed in an aqueous phase as follows:

| | |
|---|---|
| To 22 g of the green oil dispersion was added Silica dispersion* | 30 g |
| Water | 50 |

*as described above and the combined mixture was agitated for 4 minutes with a "Soniprobe" ultrasonic probe (supplied by Lucas Dawe Ultrasonics) to form an oil-in-water dispersion. The probe used had a tip diameter of half an inch (1.3 cm), and the power setting employed was 6.5 or 65%.

| | |
|---|---|
| The resulting dispersion was then added to Gelatin solution in water, 12.5 wt % | 33.3 g |
| Water | 43.3 |
| Poly(styrene-alt-maleic acid), sodium salt, 5 wt % solution in water | 20 |
| sodium dodecyl sulphate, 10 wt % solution in water | 3.3 |

When coated on a glass slide and allowed to dry, microscopic examination showed approximately circular green elements of approximately 6 microns average diameter.

Magenta Aqueous Dispersion:

The following mixture was put in a glass jar together with about 30 ml of 1 mm diameter zirconia beads and ball-milled for three days:

| | | |
|---|---|---|
| Cromophtal Violet GT* | 5.0 g | |
| Polyvinyl pyrrolidone, m.wt 40,000 | 0.5 | |
| Water | 44.5 | |

*pigment supplied by CIBA Specialty Chemicals plc

Microscopic examination of a sample coated on a glass slide with a little gelatin showed the particle size of the pigment to be of the order of 0.2 microns and less.

Cyan Aqueous Dispersion:

The dispersion, which comprised 10 wt % of bridged aluminum phthalocyanine (bis(phthalocyanylalumino) tetraphenyldisiloxane), obtained from the Synthetic Chemicals Division of Eastman Kodak Co., was prepared according to the procedure of Example 13 of U.S. Pat. No. 5,738,716. The particle size of the dispersion was less than 0.1 microns.

Coating of the Color Filter Array:

Portions of the red oil dispersion, the green oil dispersion, and the two aqueous pigment dispersions were mixed together with water and gelatin at a temperature of 40° C. and coated with an experimental slide-hopper coating machine on top of the emulsion coating described above. The gelatin concentration in the coating melt was 1.5 wt %, and the melt was applied to the emulsion coating at a wet coverage of 40 ml per square meter, to give the following coated laydowns:

| | |
|---|---|
| Red oil dispersion* | 1.5 g/m2 |
| Green oil dispersion* | 1.15 |
| Cyan pigment | 0.10 |
| Violet pigment | 0.15 |
| Gelatin | 0.6 |

*the cited laydowns refer to the sum of pigments, stabilizers and the two solvents tricresyl phosphate and N,N-di-n-butyl lauramide, and exlude the ethyl acetate.

A further protective layer was simultaneously coated above the color filter array layer, this layer comprised gelatin (7.5 wt % solution in water) and the hardener bis (vinylsulphonyl)methane, to give coated laydowns of 1.5 g/m2 and 0.084 g/m2respectively.

Microscopic examination of a portion of the coating, after treatment with photographic fixer solution, showed the color filter array to comprise randomly ordered approximately circular red and green elements of approximate diameter 7 and 6 microns respectively, surrounded by an essentially uniform blue colored "sea".

Formation of Image:

The coating was slit to 35 mm width and a length of it was perforated with the normal pattern of 35 mm film perforations and loaded into a 35 mm cassette. The cassette was loaded into a Nikon 35 mm camera, the film being oriented such that light passing through the lens of the camera passed first through the color filter array, then through the emulsion layer. The film was then exposed to an outdoors scene at an exposure index of about 200 ISO, using the camera's metering system.

The film was developed for 2 minutes at 25C. in the following developer solution, which had been adjusted to a pH of 12.0:

| | |
|---|---|
| Trisodium orthophosphate dodecahydrate | 80 g/l |
| Sorbitol | 10 |
| sodium sulphite (anh.) | 80 |
| sodium bromide | 2.0 |
| 4-hydroxymethyl-4-methyl-1-phenyl-3-pyrazolidone | 1.0 |
| 6-nitrobenzimidazole | 0.02 |

pH adjusted to 12.0 with dilute sulphuric acid solution.

It was then fixed for 1 minute in Kodak "3000" Fixer Solution diluted 1+3 with water, then washed for 3 minutes and dried. A colored negative image of the scene was visible.

The image was then scanned with a Kodak DLS scanner and the resulting image file imported into Adobe Photoshop™ image manipulation software. The "Autolevels" command was used to correct overall brightness, contrast and color balance, then the image was converted to L*a*b* color space. The a and b channels were treated with a blurring filter (Gaussian blur, 12 pixels radius) then their contrast increased using a numerical value of 80, which resulted in a strong increase in color saturation. The image was converted back to R,G,B space and color saturation and color balance adjusted to give a pleasing colored image of the original scene.

A color filter array having no white or colorless areas between the elements leads to superior capture of color information obtained therefrom Such a color filter array also leads to superior reconstruction of image information when used with a method of image processing. One such method is disclosed in co-pending application no. GB 0002481.0.

The small size colored elements of the invention can pack closely together and overlap each other effectively to fill in the gaps between the larger colored elements. Small particulate water-immiscible elements give improved performance to, for instance, dyed polymer or gelatin, because they are less prone to wander or be displaced than dyes. When the small particulate water-immiscible elements comprise pigment particles, improved light stability is expected relative to dyes. Furthermore, it is possible to incorporate a greater molar concentration of particulate matter in a given thickness of coated polymer layer than of bound, molecularly dispersed dye. This allows improved filter optical densities within the limited thickness of the preferred embodiment of the color filter array.

The invention has been described with particular reference to one example. It will be understood by those skilled in the art that variations and modifications may be effected within the spirit and scope of the invention as defined in the appended claims.

PARTS LIST

1. filter layer
2. colored particles
3. binder
4. filter layer
5. colored elements
6. filter elements
7. support layer
8. antihalation layer
9. emulsion layer
10. supercoat

What is claimed is:

1. A color filter array comprising a water soluble or water dispersible binder, at least two color classes of water immiscible colored filter elements and a further color class of water immiscible colored filter elements the mean diameter of which is less than the mean diameter of the at least two color classes of elements.

2. An array as claimed in claim 1 wherein the at least two color classes of elements have a mean diameter of between 2 and 20 micrometers and the further color class of elements have a mean diameter of less than 1 micrometer.

3. An array as claimed in claim 2 wherein the further color class of elements have a mean diameter of less than 0.3 micrometer.

4. An array as claimed in claim 1 wherein the water immiscible color elements comprise droplets of a water-immiscible oily liquid having pigments dispersed therein.

5. An array as claimed in claim 1 wherein the water immiscible color elements comprise droplets of a water-immiscible oily liquid having dyes dissolved therein.

6. An array as claimed in claim 4 wherein the droplets of water immiscible oily liquid also have polymeric and/or particulate dispersing agents dissolved or dispersed therein.

7. An array as claimed in claim 1 wherein the larger size classes of water immiscible colored filter elements comprise droplets of a water immiscible oily liquid having dyes and/or pigments dissolved or dispersed therein and the smaller size class of water immiscible colored filter elements comprise finely milled particles of pigment.

8. An array as claimed in claim 1 wherein the dried thickness of the binder layer containing the smaller size class of colored filter elements is similar to or smaller than the thickness of the dried filter elements of the larger size class.

9. An array as claimed in claim 1 wherein the binder is formed of gelatin.

10. An array as claimed in claim 1 incorporated as part of a color photographic film.

* * * * *